(12) United States Patent
Xiao et al.

(10) Patent No.: US 12,197,544 B2
(45) Date of Patent: Jan. 14, 2025

(54) METHOD AND SYSTEM FOR DEFENDING AGAINST ADVERSARIAL SAMPLE IN IMAGE CLASSIFICATION INCLUDES DENOISING BY AN ADVERSARIAL DENOISING NETWORK, AND DATA PROCESSING TERMINAL

(71) Applicant: Xidian University, Xi'an (CN)

(72) Inventors: Yang Xiao, Xi'an (CN); Chengjia Yan, Xi'an (CN); Qingqi Pei, Xi'an (CN)

(73) Assignee: XIDIAN UNIVERSITY, Xi'an (CN)

( * ) Notice: Subject to any disclaimer, the term of this patent is extended or adjusted under 35 U.S.C. 154(b) by 367 days.

(21) Appl. No.: 17/699,201

(22) Filed: Mar. 21, 2022

(65) Prior Publication Data

US 2023/0022943 A1  Jan. 26, 2023

(30) Foreign Application Priority Data

Jul. 22, 2021 (CN) .......................... 202110831879.4

(51) Int. Cl.

| | |
|---|---|
| *G06K 9/62* | (2022.01) |
| *G06F 18/213* | (2023.01) |
| *G06F 18/214* | (2023.01) |
| *G06F 18/22* | (2023.01) |
| *G06F 18/2415* | (2023.01) |
| *G06T 5/70* | (2024.01) |

(Continued)

(52) U.S. Cl.
CPC ........ *G06F 18/2415* (2023.01); *G06F 18/213* (2023.01); *G06F 18/214* (2023.01); *G06F 18/22* (2023.01); *G06T 5/70* (2024.01); *G06T 2207/20081* (2013.01); *G06V 30/164* (2022.01); *G06V 30/18* (2022.01)

(58) Field of Classification Search
None
See application file for complete search history.

(56) References Cited

U.S. PATENT DOCUMENTS

| | | | |
|---|---|---|---|
| 10,661,065 B1 * | 5/2020 | Jackson | A61M 35/10 |
| 2009/0324117 A1 * | 12/2009 | Demandolx | G06T 5/10 |
| | | | 382/254 |
| 2021/0056404 A1 * | 2/2021 | Goswami | G06F 18/22 |

(Continued)

*Primary Examiner* — Haris Sabah
(74) *Attorney, Agent, or Firm* — Bayramoglu Law Offices LLC

(57) ABSTRACT

A method for defending against an adversarial sample in image classification includes: denoising, by an adversarial denoising network, an input image to acquire a reconstructed image; acquiring, by a target classification model, a predicted category probability distribution of the reconstructed image; acquiring, by the target classification model, a predicted category probability distribution of the original input image; calculating an adversarial score of the input image, and determining the input image as an adversarial sample or a benign sample according to a threshold; outputting a category prediction result of the reconstructed image if the input image is determined as the adversarial sample; and outputting a category prediction result of the original input image if the input image is determined as the benign sample. A system for defending against an adversarial sample in image classification, and a data processing terminal are further provided.

15 Claims, 6 Drawing Sheets

(51) Int. Cl.
    *G06V 30/164*    (2022.01)
    *G06V 30/18*    (2022.01)

(56) References Cited

U.S. PATENT DOCUMENTS

2023/0298315 A1* 9/2023 Sheikholeslami .... G06F 18/214
                                                707/737
2023/0376120 A1* 11/2023 Hong ........................ G06T 5/70

* cited by examiner

METHOD AND SYSTEM FOR DEFENDING AGAINST ADVERSARIAL SAMPLE IN IMAGE CLASSIFICATION INCLUDES DENOISING BY AN ADVERSARIAL DENOISING NETWORK, AND DATA PROCESSING TERMINAL

CROSS REFERENCE TO THE RELATED APPLICATIONS

This application is based upon and claims priority to Chinese Patent Application No. 202110831879.4, filed on Jul. 22, 2021, the entire contents of which are incorporated herein by reference.

TECHNICAL FIELD

The present disclosure belongs to the technical field of artificial intelligence (AI) and, in particular, the present disclosure relates to a method and system for defending against an adversarial sample in image classification, and a data processing terminal.

BACKGROUND

In recent years, the deep learning (DL) technology based on deep neural network (DNN) models has developed rapidly and has been widely used in many fields in the real world, such as computer vision (CV), natural language processing (NLP), and autonomous driving. In tasks that are hard to model and process by traditional methods, the DNN models have shown excellent performance.

However, with the widespread application of the DL technology, the security of intelligent systems has gradually attracted people's attention. Recent studies have shown that the DNN models are prone to output incorrect predictions due to attacks from adversarial samples. In 2014, Szegedy et al. first found that adding extremely small perturbations to the input can mislead neural network classification models to output incorrect predictions with extremely high confidence. This finding has inspired extensive research on adversarial attacks and defenses in the DL field. On this basis, Carlini and Wagner proposed an adversarial sample generation method with very strong attack performance that can fool DNN models with low cost and high success rate. By making improvements and adding new constraints, this method can successfully bypass a variety of adversarial defense mechanisms. Later, Moosavi-Dezfooli et al. found that a DNN classification model can be successfully deceived by constructing a "universal adversarial perturbation" and applying one-time generated adversarial noise to a plurality of images. Further, Athalye et al. demonstrated that real-world objects fabricated by three-dimensional (3D) printing can fool DNN-based target detection systems in the real world. Adversarial samples bring huge hidden hazards to DL-based artificial intelligence (AI) systems, especially in fields with high security requirements, such as intelligent driving and assisted medical care. Attackers may add subtle perturbations that are imperceptible to the naked eye to system inputs, so as to fool intelligent systems to make improper decisions, which can lead to system failure or even collapse, with catastrophic consequences.

At present, many defense methods have been proposed to deal with the emerging adversarial sample attacks against DNNs and solve the huge security risks brought to DL-based AI systems. These methods are mainly designed based on robust defense and detective defense. The robust defense methods include adversarial training, defensive distillation, and population variance minimization of images, etc. They aim to make the neural network classification model perform correct classifications when attacked by adversarial samples by modifying the training process or network structure of the model and preprocessing the input data. The detective defense methods focus on finding the dissimilarity between adversarial samples and benign samples and setting up detectors to accurately identify adversarial samples from the input data thereby rejecting adversarial samples from entering the classification model. These methods have achieved some results in the early defense of adversarial samples. However, the existing methods have shortcomings in terms of processing efficiency and universality. For example, they rely too heavily on existing adversarial attacks during training, resulting in too high "specificity" for the corresponding attacks. Their preprocessing efficiency is too low to be effectively expanded and applied on large-scale images. They are only effective against a small part of attacks and lack universality for different types and strengths of attacks. Additionally, they are vulnerable to secondary attacks that render them completely ineffective.

Investigation and analysis show that the existing methods mainly have the following problems:

(1) Robust defense. First, adversarial training methods rely on adversarial samples, resulting in certain "specificity" of the classification model to the adversarial samples used in training. That is, a model trained by a certain type of adversarial sample can often only defend against this type of adversarial sample, but cannot successfully defend against other types and strengths of adversarial samples. Second, input preprocessing methods represented by thermometer encoding, population variance minimization, etc., usually will greatly reduce the classification accuracy of the model on benign samples. Some preprocessing methods have the problems of high computational overhead, long preprocessing time, and low operating efficiency, making them hard to effectively expand and apply on complex image datasets. Moreover, for methods that work by adjusting the classification model and training process, for example, distillation defense, training penalty item modification, etc., they often require retraining the classification model. They require a large extra overhead in large-scale engineering practice applications, and they are still unable to resist strong adversarial attacks, such as Carlini-Wagner (C & W) attacks.

(2) Detective defense. First, detective defense methods aim to directly train a neural network detector by adversarial samples and benign samples, so as to discriminate between adversarial samples and benign samples. The training phase relies on adversarial samples, which inevitably leads to "specificity" to specific attacks. Second, threshold detectors based on principal component variance, reconstruction error, SoftMax output, etc. are often only effective for simple datasets, but not for complex datasets. Moreover, some methods are only effective for weak attacks, but not for strong attacks. Moreover, tests based on sample distributions, such as the work of Feinman et al., require maintaining a benign sample library and require a lot of calculations to determine whether the input image indicates the real data distribution of a category, resulting in poor practicability. More importantly, the existing adversarial sample detectors are vulnerable to secondary attacks. If the attacker knows enough about the defense measures, the attacker can bypass the detectors by adjusting the constraint function for generating adversarial samples.

To sum up, adversarial samples bring great security risks to DL-based intelligent systems, and the existing methods are hard to achieve effective defense effects in real application scenarios. Therefore, designing an efficient and versatile adversarial sample defense method has extremely important theoretical and practical significance.

Through the above analysis, the problems existing in the prior art are summarized as follows:

(1) The existing adversarial training methods rely on adversarial samples, resulting in certain "specificity" of the classification model to the adversarial samples used in training. That is, a model trained by a certain type of adversarial sample can often only defend against this type of adversarial sample, but cannot successfully defend against other types and strengths of adversarial sample attacks.

(2) The input preprocessing methods represented by thermometer encoding, population variance minimization, etc., usually will greatly reduce the classification accuracy of the model on benign samples. Some preprocessing methods have the problems of high computational overhead, long preprocessing time and low operating efficiency, making them hard to effectively expand and apply on complex image datasets.

(3) For methods that work by adjusting the classification model and training process, for example, distillation defense, training penalty item modification, etc., they often require retraining the classification model. They require a large extra overhead in large-scale engineering practice applications, and they are still unable to resist strong adversarial attacks, such as C & W attacks.

(4) The existing detective defense methods will inevitably lead to "specificity" to specific attacks. The threshold detectors based on principal component variance, reconstruction error, SoftMax output, etc. are often only effective for simple datasets, but not for complex datasets. Moreover, some methods are only effective for weak attacks, but not for strong attacks.

(5) The tests based on sample distributions require maintaining a benign sample library, and require a lot of calculations to determine whether the input image indicates the real data distribution of a category, resulting in poor practicability. Moreover, the existing adversarial sample detectors are vulnerable to secondary attacks. If the attacker knows enough about the defense measures, the attacker can bypass the detectors by adjusting the constraint function for generating adversarial samples.

The difficulty in solving the above problems is as follows: First, in real-world applications, the number and types of adversarial samples that defenders can acquire during training are limited and it is hard for them to consider all known adversarial samples during training. Moreover, the defense mechanisms trained with specific adversarial samples are hard to deal with unknown types of adversarial sample attacks in the future, resulting in extremely limited robustness and expandability. Second, in real life, the content composition of input natural samples is often more complex and the effectiveness of various existing adversarial defense techniques will decrease significantly as the complexity of the input natural samples increases. Therefore, the universality of various existing defense solutions in practical applications is severely limited.

The present disclosure solves the above problems and achieves positive effects. First, the present disclosure designs a denoising network structure based on an edge feature enhancement (EFE) block and a multi-scale feature (MSF) block and trains an adversarial denoising network by a visual and categorical features-guided loss function. The present disclosure denoises and reconstructs the input data, which reduces the amount of calculation and improves the operation efficiency. The present disclosure separates the entire process from a target classification model, avoiding dependence and adjustment on the target classification model. In addition, the present disclosure supports "plug and play" and "flexible expansion", which reduces the work required to set up the defense mechanism and reduces the complexity of deployment in large-scale engineering practice. Second, the present disclosure establishes an adversarial sample detection module based on an adversarial score threshold to decouple adversarial attacks in the training and deployment of the defense mechanism. This avoids reliance on specific adversarial attacks, reduces the "specificity" of the defense mechanism to specific adversarial attacks, and improves the ability of the defense mechanism to defend against unknown adversarial attacks. Moreover, the present disclosure preprocesses the input data through a plurality of adversarial denoising networks, which improves the universality of the defense mechanism to deal with adversarial attacks of different types and strengths. The present disclosure can flexibly adjust the number of denoising networks according to security requirements, thereby improving the defense ability of the defense mechanism against secondary attacks and increasing the expandability and flexibility of the defense mechanism.

SUMMARY

In order to overcome the deficiencies in the application of the existing adversarial sample defense methods in real environments, the present disclosure provides a method and system for defending against an adversarial sample in image classification, and a data processing terminal, and particularly relates to a method and system for defending against an adversarial sample based on integrated adversarial denoising in image classification, and a data processing terminal.

The present disclosure is implemented as follows: a method for defending against an adversarial sample in image classification includes the following steps:

denoising, by an adversarial denoising network, an input image to acquire a reconstructed image; acquiring, by a target classification model, a predicted category probability distribution of the reconstructed image; acquiring, by the target classification model, a predicted category probability distribution of the original input image; calculating an adversarial score of the input image, and determining the input image as an adversarial sample or a benign sample according to a threshold; outputting a category prediction result of the reconstructed image if the input image is determined as an adversarial sample; and otherwise, outputting a category prediction result of the original input image if the input image is determined as a benign sample.

Further, the method for defending against an adversarial sample in image classification includes the following steps:

step 1: preprocessing, by the adversarial denoising network, the input image to acquire the reconstructed image, so as to well remove adversarial noise in the input image;

step 2: inputting the reconstructed image into the target classification model, and acquiring the predicted category probability distribution of the reconstructed image from the target classification model;

step 3: inputting the original input image without being processed by the adversarial denoising network into the target classification model, and acquiring the predicted category probability distribution of the original input image from the target classification model;

step 4: calculating an adversarial score of the input image by a visual reconstruction error and a categorical reconstruction error between the reconstructed image and the original input image, so as to accurately determine the original input image as a benign sample or an adversarial sample; and step 5: outputting a classification result of the original input image based on an adversarial detection result of the input image: directly outputting the classification result of the original input image when the original input image is determined as a benign sample; and outputting a classification result of the reconstructed image acquired by denoising when the input image is determined as an adversarial sample, so as to achieve an effective defense against the adversarial sample.

Further, in step 1, the adversarial denoising network may be obtained by training with a noise image produced by adding white Gaussian noise (WGN) to a clean benign sample, using an edge feature enhancement (EFE)-based denoising network as a backbone and a visual and categorical features-guided adversarial loss function as a training objective to optimize a parameter of the adversarial denoising network; and the EFE-based denoising network may be a denoising autoencoder-decoder network, which may adopt, based on an EFE block and a multi-scale feature (MSF) block, a down-sampling operation in an encoding phase and an up-sampling operation in a decoding phase, and design a long skip connection (LSC) between intermediate layers.

Further, the EFE block may be configured to:

process an input tensor with three calculation flows, including a Gaussian smoothing flow, an EFE flow and a convolution flow: process, in the Gaussian smoothing flow, the input tensor by a Gaussian Blur operation, a Convolution operation, a batch normalization (Batch Norm) operation and a leaky rectified linear unit (Leaky ReLU) operation sequentially, and then output a result; process, in the EFE flow, the input tensor by an Edge Detection operation, the Convolution operation, the Batch Norm operation and the Leaky ReLU operation sequentially, and then output a result; process, in the convolution flow, the input tensor by the Convolution operation, the Batch Norm operation and the Leaky ReLU operation sequentially, and then output a result; and concatenate the output results of the three calculation flows by a Concatenate operation, perform the Convolution operation to reduce a number of channels, and output a calculation result; and the MSF block may be configured to:

process the input tensor with a plurality of calculation flows: process the input tensor by the Convolution operation, the Batch Norm operation and the Leaky ReLU operation sequentially in each of the calculation flows; appropriately select convolution kernels of different sizes to extract feature information of different scales in different calculation flows; and concatenate, by the Concatenate operation, multi-channel features acquired by the plurality of calculation flows, and perform the Convolution operation by using a 1×1 convolution kernel to adaptively extract and retain useful feature information in a multi-channel feature map.

Further, in step 1, the adversarial denoising network may be trained with a visual and categorical features-guided loss function as an optimization objective;

the visual and categorical features-guided loss function may include a visual feature similarity loss item and a categorical feature similarity loss item, where the visual feature similarity loss item may be:

$$\|x-D(x')\|_p;$$

where, x denotes a clean training sample; $x'=x+n_o$ denotes a noise image produced by adding noise, $n_o$ denotes additive white Gaussian noise (AWGN) with a strength $\sigma$; $D(\cdot)$ denotes the denoising network; and $\|x-D(x')\|_p$ measures a visual similarity between a denoised image and an original noise-free image by a p-norm, and the penalty item guides the denoising network to remove unwanted noise in a visual domain;

the categorical feature similarity loss item may be:

$$KL(C(x)\|C(D(x')));$$

where, $C(\cdot)$ denotes the target classification model, and is configured to acquire the predicted category probability distribution of the denoised reconstructed image $D(x')$ and the predicted category probability distribution of the original input image x, that is, output vectors of a SoftMax layer; $KL(p\|q)$ denotes a Kullback-Leibler (KL) divergence between two distributions p and q, and is configured to measure a dissimilarity between the two distributions) p and q; and $KL(C(x)\|C(D(x')))$ constrains the denoised reconstructed image to maintain the same categorical feature as the original input image;

the visual and categorical features-guided loss function may be:

$$\text{Loss}=\alpha\cdot\|x-D(x')\|_p+(1-\alpha)\cdot KL(C(x)\|C(D(x')));$$

where, $\alpha\in[0,1]$ denotes a trade-off coefficient between the two penalty items, taking the parameter of the denoising network as an optimization object and the visual and categorical features-guided loss function as a minimization objective.

Further, in step 4, the adversarial score calculated based on the visual reconstruction error and the categorical reconstruction error may be used as a basis for determining whether the input image is the adversarial sample or the benign sample; and the visual reconstruction error may be:

$$\|x-D(x)\|_p;$$

where, x denotes the input image; $D(x)$ denotes the reconstructed image acquired by preprocessing by a denoiser $D(\cdot)$; and $\|x-D(x)\|_p$ denotes the visual reconstruction error, measured by using a p-norm, between the original input image and the reconstructed image acquired by preprocessing by the denoiser;

the categorical reconstruction error may be:

$$KL(C(x)\|C(D(x)));$$

where, this item uses a KL divergence as a metric to measure a dissimilarity between the predicted category probability distribution of the reconstructed image acquired by preprocessing by the denoiser $D(\cdot)$ and the predicted category probability distribution of the original input image x; and the predicted category probability distributions are denoted by output vectors of a SoftMax layer of the target classification model)

the adversarial score of a test sample may be calculated as follows:

$$\text{Adversarial Score}=\|x-D(x)\|_p+KL(C(x)\|C(D(x)));$$

where, a corresponding adversarial score threshold may be set according to an adversarial score distribution of the benign sample; and an input image with an adversarial score exceeding the adversarial score threshold may be determined as an adversarial sample, and an input image with an adversarial score not exceeding the adversarial score threshold may be determined as a benign sample, which may effectively distinguish between the benign sample and the adversarial sample;

in a training phase, a plurality of denoisers may be acquired by training with noise of different strengths, and may be used to calculate adversarial score thresholds based on the benign sample; in a testing phase, the test sample may be reconstructed through the plurality of denoisers integrated, and then input into the target classification model to calculate adversarial scores; the adversarial scores may be compared with the adversarial score thresholds; if an adversarial score exceeds an adversarial score threshold, a ratio of a component may be greater than 1; if a maximum ratio is greater than 1, an input image may be determined as an adversarial sample, and a classification result of an image reconstructed by a denoiser corresponding to the component with a ratio greater than 1 may be output; and otherwise, if the input image is determined as a benign sample, a classification result of the original input image without being processed by the denoiser may be output; and a SoftMax function defined with a temperature may be used to process a model output, so as to acquire a predicted category probability distribution:

$$SoftMax(l)_i = \frac{\exp(l_i/T)}{\sum_{j=1}^{n} \exp(l_j/T)};$$

where, for an n-category problem, $l_i$ denotes a component of a logits vector l output by the target classification model C(•) on a category i, and T denotes the temperature, and is a hyperparameter; a higher temperature will smooth the probability distribution of the model output and be more sensitive to an adversarial sample with a higher strength; and a lower temperature will sharpen the probability distribution of the model output and be more sensitive to an adversarial sample with a lower strength.

A second objective of the present disclosure is to provide a system for defending against an adversarial sample in image classification by the method for defending against an adversarial sample in image classification. The system includes:

a denoiser module, including the adversarial denoising network, and configured to denoise and reconstruct an input image;

a classifier module, including the target classification model, and configured to acquire a predicted category probability distribution of the input image and a predicted category probability distribution of a reconstructed image acquired by preprocessing the input image;

an adversarial score calculation module, configured to calculate an adversarial score of the input image;

an adversarial sample detection module, configured to compare the adversarial score of the input image with a normal threshold of a benign sample to perform adversarial determination on the input image; and an output control module, configured to output a category prediction result of the input image based on an adversarial determination result of the input image.

A third objective of the present disclosure is to provide a computer device. The computer device includes a memory and a processor, where the memory stores a computer program; and the computer program is executed by the processor to implement the following steps:

denoising, by an adversarial denoising network, an input image to acquire a reconstructed image; acquiring, by a target classification model, a predicted category probability distribution of the reconstructed image; acquiring, by the target classification model, a predicted category probability distribution of the original input image; calculating an adversarial score of the input image, and determining the input image as an adversarial sample or a benign sample according to a threshold; outputting a category prediction result of the reconstructed image if the input image is determined as an adversarial sample; and otherwise, outputting a category prediction result of the original input image if the input image is determined as a benign sample.

A fourth objective of the present disclosure is to provide a computer-readable storage medium. The computer-readable storage medium stores a computer program, where the computer program is executed by a processor to implement the following steps:

denoising, by an adversarial denoising network, an input image to acquire a reconstructed image; acquiring, by a target classification model, a predicted category probability distribution of the reconstructed image; acquiring, by the target classification model, a predicted category probability distribution of the original input image; calculating an adversarial score of the input image, and determining the input image as an adversarial sample or a benign sample according to a threshold; outputting a category prediction result of the reconstructed image if the input image is determined as an adversarial sample; and otherwise, outputting a category prediction result of the original input image if the input image is determined as a benign sample.

A fifth objective of the present disclosure is to provide a data processing terminal, which is configured to implement the system for defending against an adversarial sample in image classification.

All the above technical solutions show that the present disclosure can effectively improve the security of a deep learning (DL)-based AI system. Specifically, the present disclosure has the following positive effects.

(1) The present disclosure decouples adversarial attacks during training and deployment, and avoids reliance on knowledge of specific adversarial attacks through the detection based on the adversarial score threshold. The present disclosure completes the implementation and deployment of the defense system without adversarial samples participating in the training. The present disclosure solves the problem of "specificity" existing in traditional defense methods relying on adversarial sample training, and further improves the defense capability of the defense system against unknown adversarial attacks.

(2) The present disclosure improves the general adaptability of the defense system to different adversarial attacks. The effectiveness of existing adversarial defense measures is mostly limited to adversarial sample attacks of a certain type or certain strength, and lacks the universality of adversarial sample attacks of various types and strengths. The present disclosure achieves stable defense capability against various types and strengths of adversarial attacks by integrating a plurality of adversarial denoisers.

(3) The present disclosure does not require adjustments to the original classification model. Many existing adversarial defense methods require adjustments to the structure or training process of the original classification model, which means retraining. In the context of real large-scale engineering practice applications, the existing methods greatly increase additional overhead and implementation costs. By preprocessing the input image and performing adversarial sample defense based on the differences before and after processing, the present disclosure enables effective defense against adversarial samples without additional adjustments to the original classification model.

(4) The present disclosure has high deployment flexibility. Based on the EFE block proposed in the present disclosure, both the denoising network and the final integrated adversarial denoisers can achieve "plug and play" and "flexible expansion". The present disclosure can flexibly adjust the entire system according to the requirements of defense performance, without adding extra work for adjusting the defense mechanism.

(5) The present disclosure is economical. Many existing defense methods require the maintenance of a clean sample library and require extensive computation and comparison at test time. The present disclosure does not need to maintain a clean sample library, and does not need to add additional calculations, which greatly saves space and time overhead.

BRIEF DESCRIPTION OF THE DRAWINGS

To describe the technical solutions in embodiments of the present disclosure more clearly, the following briefly describes the accompanying drawings that need to be used in the embodiments. Apparently, the accompanying drawings in the following description show merely some embodiments of the present disclosure, and a person of ordinary skill in the art may derive other drawings from these accompanying drawings without creative efforts.

Figure 1:
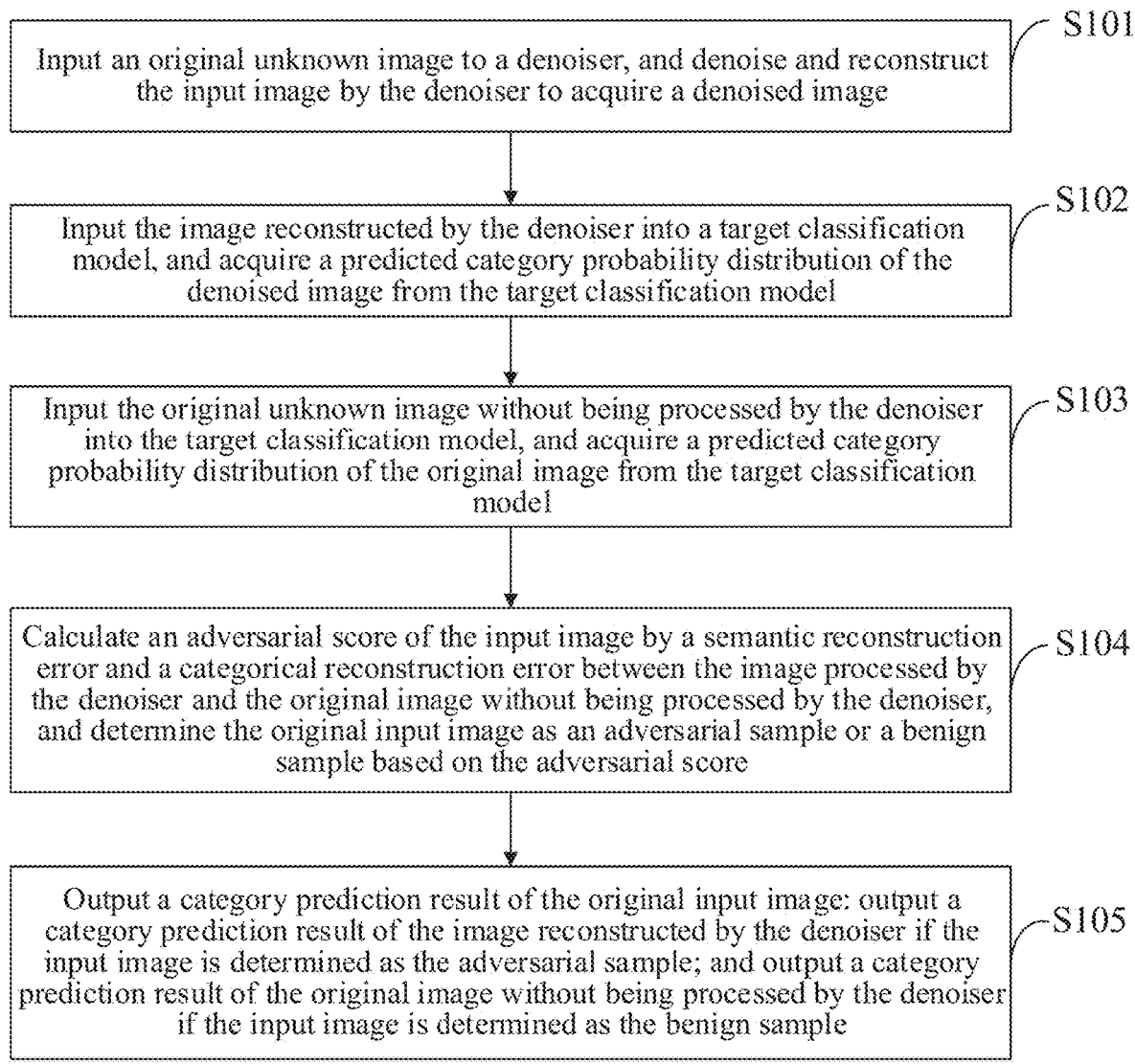
FIG. 1 is a flowchart of a method for defending against an adversarial sample in image classification according to an embodiment of the present disclosure.
Figure 4:
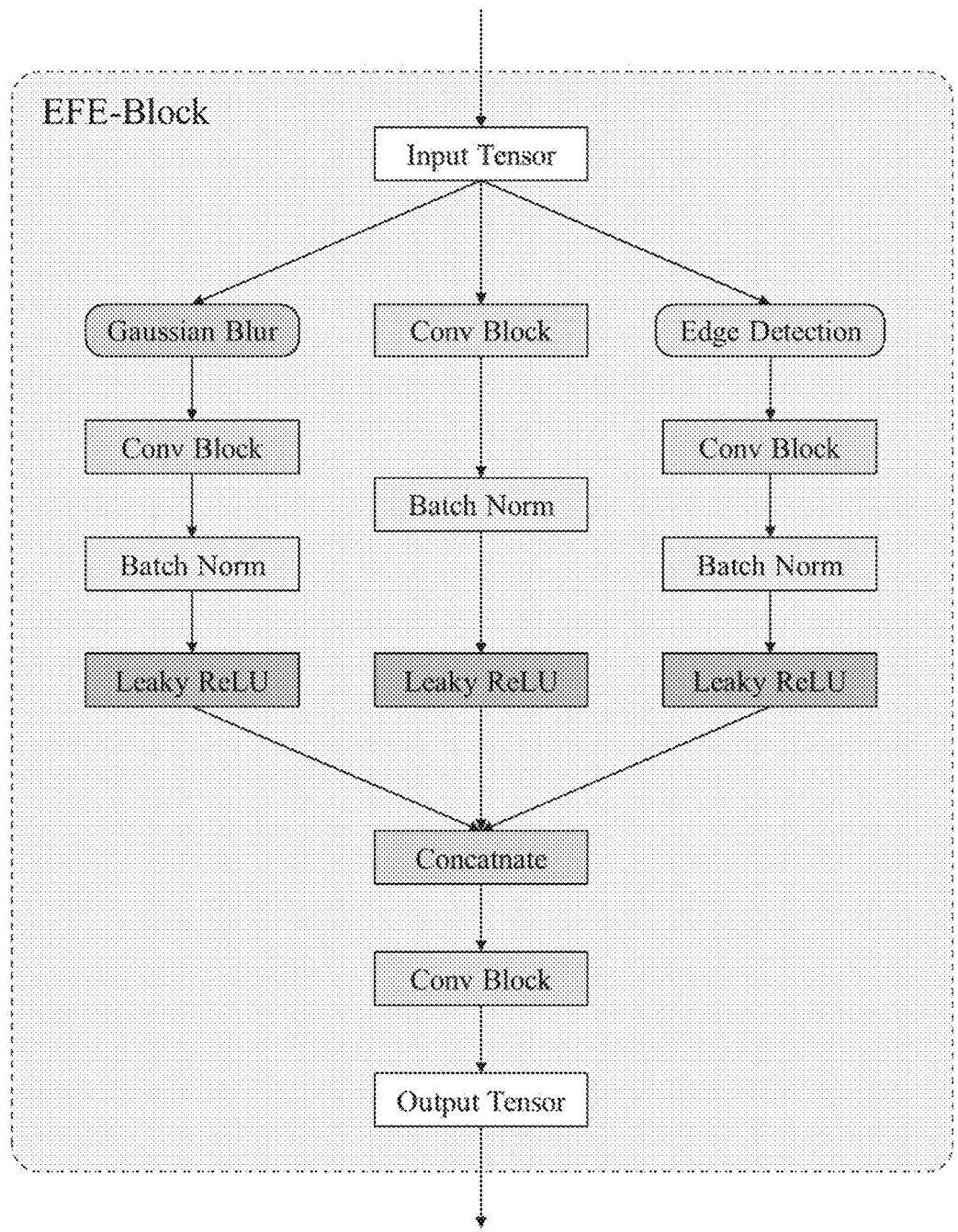
Figure 5:
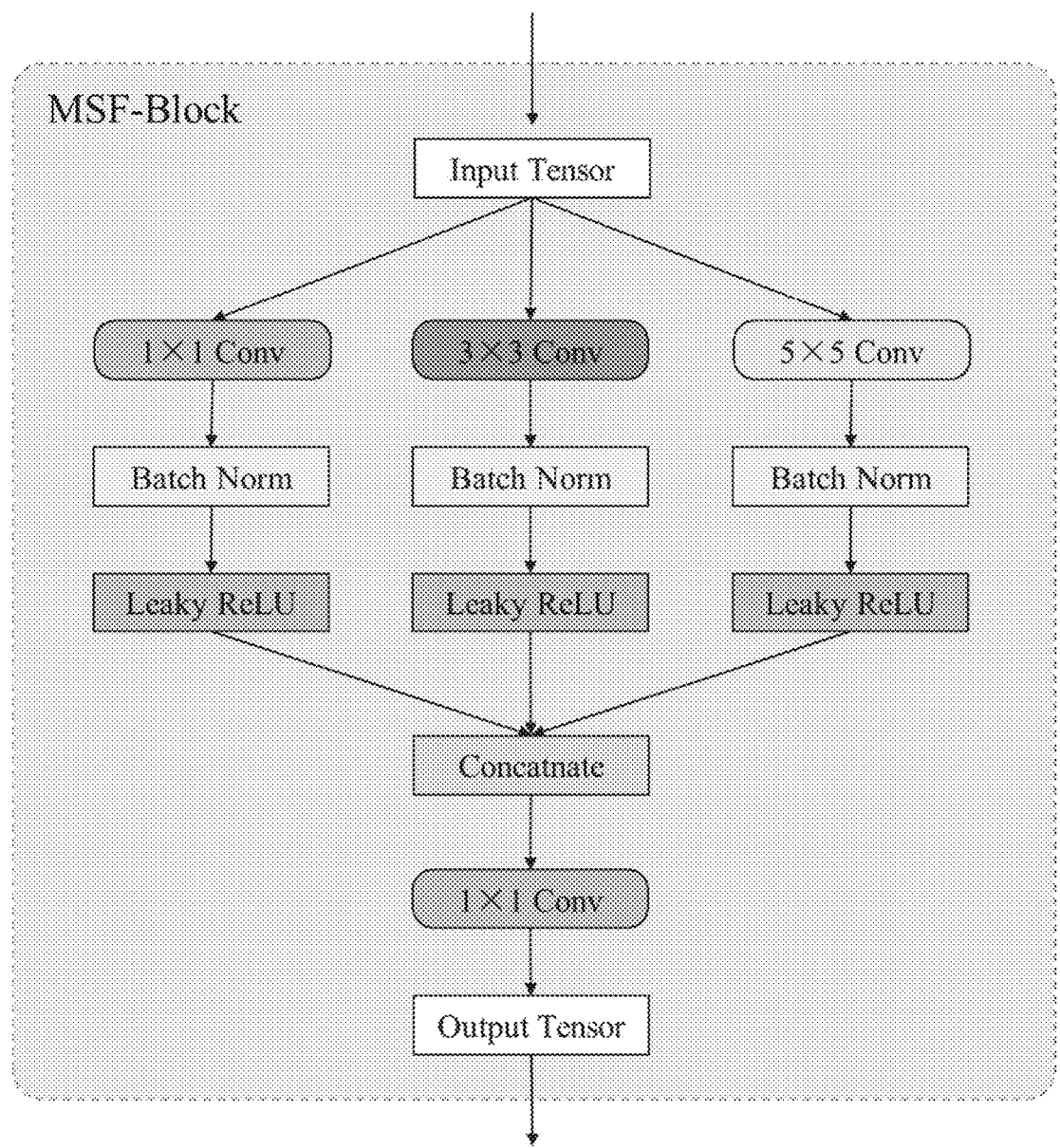
Figure 6:
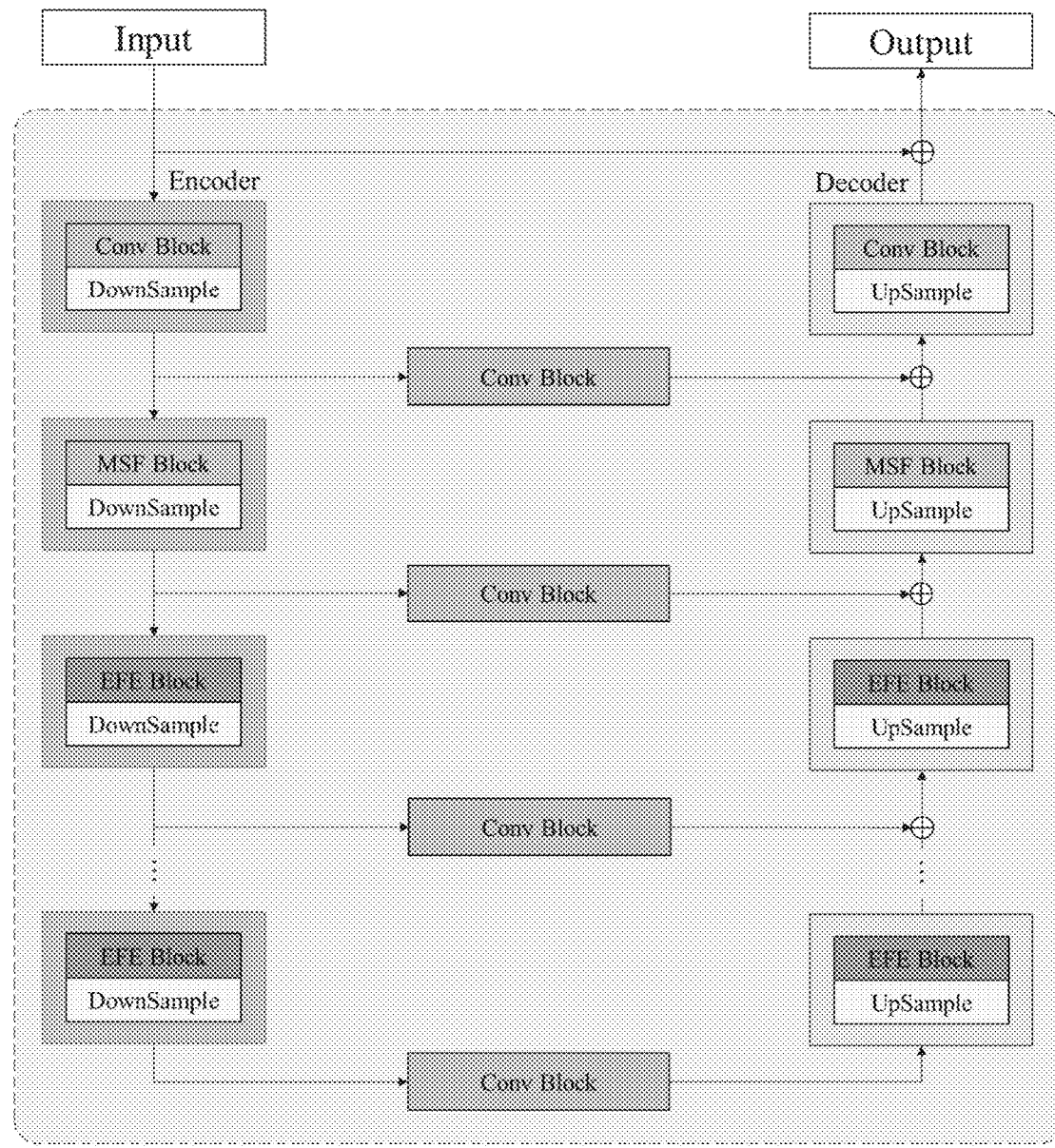

Reference Numerals: 1. denoiser module; 2. classifier module; 3. adversarial score calculation module; 4. adversarial sample detection module; and 5. output control module;

FIG. 4 is a structural diagram of an edge feature enhancement (EFE) block according to an embodiment of the present disclosure;

FIG. 5 is a structural diagram of a multi-scale feature (MSF) block according to an embodiment of the present disclosure; and FIG. 6 is a structural diagram of an EFE-based denoising network according to an embodiment of the present disclosure.

DETAILED DESCRIPTION OF THE EMBODIMENTS

To make the objective, technical solutions and advantages of the present disclosure clearer, the present disclosure will be further described in detail below with reference to the embodiments. It should be understood that the described specific embodiments are merely used to explain the present disclosure, rather than to limit the present disclosure. Theoretically, the method for defending against an adversarial sample in the present disclosure can be applied to a wide range of image classification tasks or other tasks including image classification blocks, such as face recognition and automatic driving. Moreover, the implementation technology of the target classification model is not limited to neural networks, and it is also applicable to image classification models (systems) implemented by other traditional machine learning (ML) technologies such as decision trees (DTs) and support vector machines (SVMs).

In view of the problems existing in the prior art, the present disclosure provides a method and system for defending against an adversarial sample in image classification, and a data processing terminal. The present disclosure will be described in detail below with reference to the drawings.

An embodiment of the present disclosure provides a method for defending against an adversarial sample in image classification provided. As shown in FIG. 1, the method includes the following steps:

S101: Input an original unknown image to a denoiser, and denoise and reconstruct the input image by the denoiser to acquire a processed image.

S102: Input the image processed by the denoiser into a target classification model and acquire a predicted category probability distribution of the processed image from the target classification model.

S103: Input the original unknown image without being processed by the denoiser into the target classification model and acquire a predicted category probability distribution of the original image from the target classification model.

S104: Calculate an adversarial score of the input image by a visual reconstruction error and a categorical reconstruction error between the image processed by the denoiser and the original image without being processed by the denoiser, and determine the original input image as an adversarial sample or a benign sample based on the adversarial score.

S105: Output a category prediction result of the original input image: output a category prediction result of the image processed by the denoiser if the input image is determined as an adversarial sample; and output a category prediction result of the original image without being processed by the denoiser if the input image is determined as a benign sample.

The technical solutions of the present disclosure are further described below with reference to the embodiments.

Embodiment 1

In order to overcome the deficiencies in the application of the existing adversarial sample defense methods in real environments, the present disclosure provides a method and system for defending against an adversarial sample, and a data processing terminal, and the present disclosure particularly relates to a method and system for defending against an adversarial sample based on integrated adversarial denoising in image classification, and a data processing terminal.

The present disclosure is implemented as follows: a method for defending against an adversarial sample in image classification includes the following steps:

Step 1: Denoise and reconstruct an input image by a denoiser, so as to remove an adversarial noise in the input image to acquire a denoised image.

Step 2: Input the denoised image reconstructed by the denoiser into a target classification model, and acquire a predicted category probability distribution of the denoised image from the target classification model.

Step 3: Input an original image without being processed by the denoiser into the target classification model, and acquire a predicted category probability distribution of the original input image from the target classification model.

Step 4: Calculate an adversarial score of the input image based on a visual reconstruction error and a categorical reconstruction error of the input image before and after being processed by the denoiser, and determine the input image as an adversarial sample or a benign sample based on an adversarial score threshold.

Step 5: Output a classification result of the original input image; output a category prediction result of the image reconstructed by the denoiser if the input image is determined as an adversarial sample; and output a category prediction result of the original input image without being processed by the denoiser if the input image is determined as a benign sample.

Further, in Step 1, the denoiser uses an edge feature enhancement (EFE)-based denoising network as the backbone structure. The denoising network uses a multi-scale feature extraction (MSF) block and an EFE block as the core, which combines down-sampling and up-sampling operations.

In the implementation of the MSF block, an input tensor is processed with a plurality of calculation flows. The calculation flows each sequentially include a Convolution operation, a batch normalization (Batch Norm) operation and a leaky rectified linear unit (Leaky ReLU). In different calculation flows, convolution kernels of different scales are appropriately selected. The Convolution operation is configured to compress the number of parameters of the model by means of weight sharing so as to improve the calculation speed and processing efficiency. It is also configured to capture image features adaptively, and extract image feature information at different scales through observation windows of different sizes so as to acquire more complete image structure and content information. The Batch Norm operation is configured to solve the problem of internal covariance shift in the model and improve the convergence speed and training stability of the model during training. The Leaky ReLU replaces the traditional ReLU, and avoids the problem that a "neuron" dies in case of a gradient that is close to zero or negative. Then, a Concatenate operation is performed to concatenate multi-channel features acquired by the plurality of tensor calculation flows. The Convolution operation is performed by using a 1×1 convolution kernel, which adaptively extracts and retains useful feature information in a multi-channel feature map, and reduces the number of channels and the amount of model computation.

In the implementation of the EFE block, the input tensor is processed with a plurality of calculation flows, including a Gaussian smoothing flow, an EFE flow, and a convolution flow. In the Gaussian smoothing flow, a Gaussian Blur operation is first performed to blur the input tensor so as to dilute the noise in a feature space. Then, the input tensor is processed sequentially by a Convolution operation, the Batch Norm operation and the Leaky ReLU, and is output. In the EFE flow, first, an edge detection operator is used to extract edge contour information in a feature map, so as to enhance an important feature in the input tensor. Then, the input tensor is processed sequentially by the Convolution operation, the Batch Norm operation and the Leaky ReLU, and is output. In the convolution flow, no additional preprocessing is performed on the input tensor. The input tensor is directly processed by the Convolution operation, the Batch Norm operation and the Leaky ReLU, and is output, so as to retain the original feature information in the input tensor. Then, a Concatenate operation is performed to concatenate multi-channel features acquired by the plurality of calculation flows. The Convolution operation is performed to adaptively extract and retain useful feature information in the multi-channel feature map, compress the number of channels, and reduce the amount of model computation.

Furthermore, the denoiser used in Step 1 is trained using a visual and categorical features-guided loss function as an optimization objective.

The visual and categorical features-guided loss function includes a visual feature similarity loss item and a categorical feature similarity loss item.

The visual feature similarity loss item is: $\|x-D(x')\|_p$ where, x denotes a clean training sample; $x'=x+n_\sigma$ denotes a noise image produced by adding noise, $n_\sigma$ denotes additive white Gaussian noise (AWGN) with a strength $\sigma$; $D(\bullet)$ denotes the denoising network; and $\|x-D(x')\|_p$ measures a visual similarity between a denoised image and an original noise-free image by a p-norm, and the penalty item guides the denoising network to remove unwanted noise in a visual domain.

The categorical feature similarity loss item is: $KL(C(x)\|C(D(x')))$ where, $C(\bullet)$ denotes the target classification model, and is configured to acquire the predicted category probability distribution of the denoised reconstructed image $D(x')$ and the predicted category probability distribution of the original input image x, that is, output vectors of a SoftMax layer; $KL(p\|q)$ denotes a Kullback-Leibler (KL) divergence between two distributions p and q, and is configured to measure a dissimilarity between the two distributions p and q; and $KL(C(x)\|C(D(x')))$ constrains the denoised reconstructed image to maintain the same categorical feature as the original input image.

Thus, the visual and categorical features-guided loss function is:

$$\text{Loss}=\alpha\cdot\|x-D(x')\|_p+(1-\alpha)\cdot KL(C(x)\|C(D(x')))$$

where, $\alpha\in[0,1]$ denotes a trade-off coefficient between the two penalty items, taking the parameter of the denoising network as an optimization object and the visual and categorical features-guided loss function as a minimization objective. This ensures that the denoising network can effectively remove the unwanted noise in the input image, and that the target classification model can correctly classify the denoised image.

Further, in Step 4, the adversarial score is used as a basis for determining whether the image is an adversarial sample or a benign sample. Specifically, the calculation of the adversarial score involves a visual reconstruction error and a categorical reconstruction error.

The visual reconstruction error is: $\|x-D(x)\|_p$ where, x denotes the input image; $D(x)$ denotes the reconstructed image acquired by preprocessing by a denoiser $D(\bullet)$; and $\|x-D(x)\|_p$ denotes the visual reconstruction error, measured by using a p-norm, between the original input image and the reconstructed image acquired by preprocessing by the denoiser.

The categorical reconstruction error is: $KL(C(x)\|C(D(x)))$

This item uses a KL divergence as a metric to measure a dissimilarity between the predicted category probability distribution of the reconstructed image $D(x)$ acquired by preprocessing by the denoiser $D(\bullet)$ and the predicted category probability distribution of the original input image x. The predicted category probability distributions are denoted by output vectors of a SoftMax layer of the target classification model $C(\bullet)$.

From this, the adversarial score of a test sample is calculated as follows:

$$\text{Adversarial Score} = \|x - D(x)\|_p - KL(C(x)\|C(D(x)))$$

A benign sample includes less noise and the category prediction probability distributions before and after reconstruction are not much different, so their adversarial score is lower. An adversarial sample includes more adversarial noise, so the visual reconstruction error before and after preprocessing is significantly greater than that of the benign sample. Furthermore, after the adversarial perturbation is removed, the category prediction result of the adversarial sample usually recovers from a category misled by the attacker to a true category. Therefore, the categorical reconstruction error of the adversarial sample is also greater, which eventually leads to the adversarial score of the adversarial sample exceeding the normal distribution of the benign sample. Therefore, according to the distribution of the adversarial score of the benign sample, a corresponding adversarial score threshold is set. An input image with an adversarial score exceeding the adversarial score threshold is determined as the adversarial sample, and an input image with an adversarial score not exceeding the adversarial score threshold is determined as the benign sample, which effectively distinguishes between the benign sample and the adversarial sample.

Furthermore, in Steps 1, 2 and 4, in order to improve the general adaptability of a defense device to adversarial attacks of different types and intensities, the present disclosure proposes to improve the defense capability by increasing the number of denoisers. Specifically, in a training phase, a plurality of denoisers are acquired by training with noise of different strengths, and are used to calculate adversarial score thresholds based on the benign sample. In a testing phase, the test sample is reconstructed through the plurality of denoisers integrated, and then input into the target classification model to calculate adversarial scores. The adversarial score is compared to a threshold. If the adversarial score exceeds the threshold, the ratio of the corresponding component will be greater than 1. Therefore, if a maximum ratio is greater than 1, an input image is determined as an adversarial sample, and a classification result of an image reconstructed by a denoiser corresponding to the component with a ratio greater than 1 is output. Otherwise, if the input image is determined as a benign sample, a classification result of the original input image without being processed by the denoiser is output.

Furthermore, the number of the integrated denoisers can be adjusted according to system security needs. Usually, a greater number of denoisers leads to a stronger overall ability of the denoisers to defend against the attack from the adversarial sample, making it less susceptible to a secondary attack.

Furthermore, in order to highlight the dissimilarity in the distributions of the adversarial scores between the benign sample and the adversarial sample, a more discriminative detection threshold is set. The present disclosure proposes to use a SoftMax function defined with a temperature to process the model output so as to acquire the predicted category probability distribution:

$$\text{SoftMax}(l)_i = \frac{\exp(l_i/T)}{\sum_{j=1}^{n} \exp(l_j/T)}$$

where, for an n-category problem, $l_i$ denotes a component of a logits vector l output by the target classification model $C(\bullet)$ on a category i, and T denotes the temperature, and is a hyperparameter. Typically, a higher temperature will smooth the probability distribution of the model output and be more sensitive to an adversarial sample with a higher strength. A lower temperature will sharpen the probability distribution of the model output and be more sensitive to an adversarial sample with a lower strength. A detector implemented by SoftMax with different temperatures helps to improve the general adaptability of the defense model to different types and strengths of adversarial sample attacks.

Embodiment 2

Figure 2:
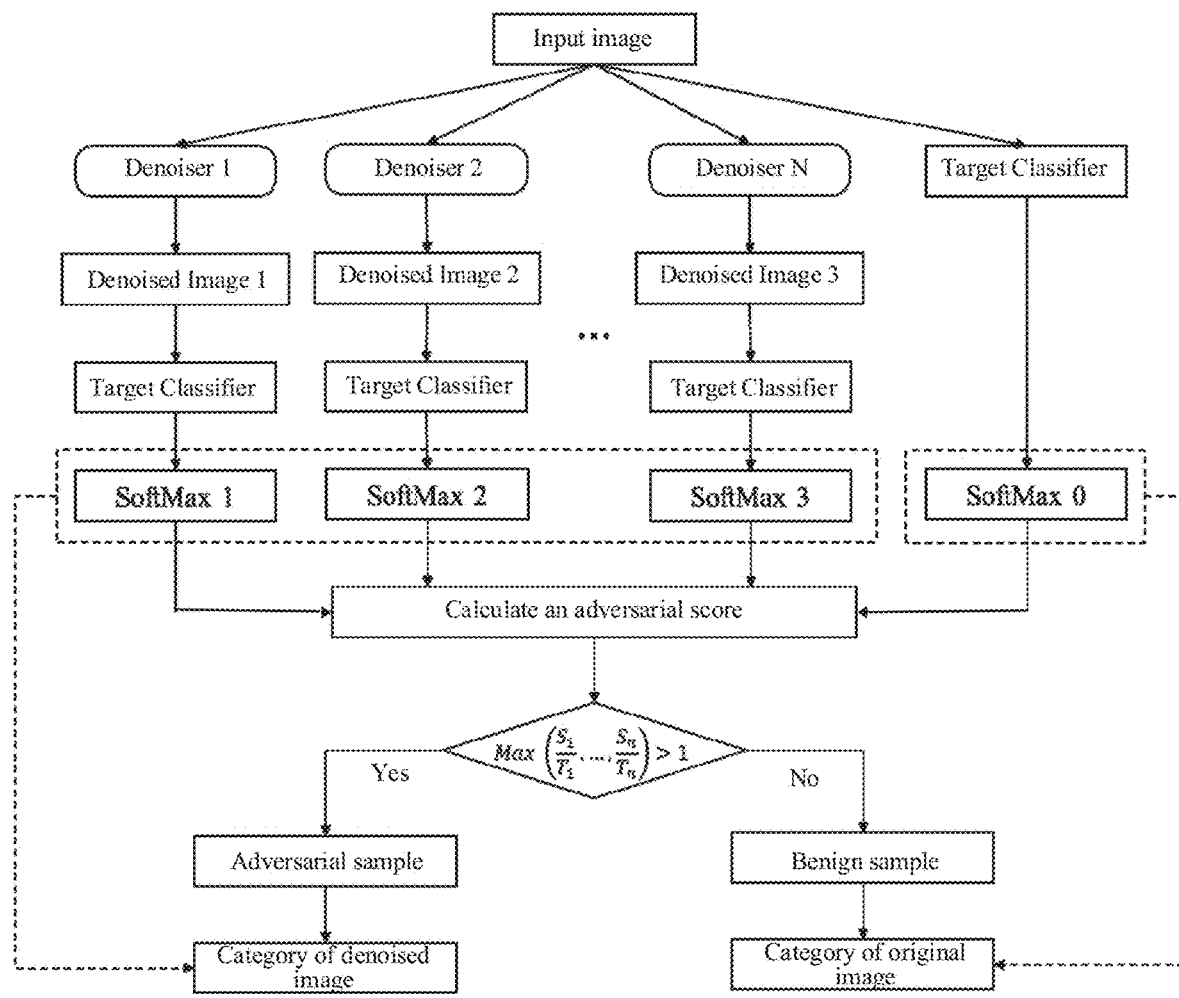
FIG. 2 is a schematic diagram of the method for defending against an adversarial sample in image classification according to an embodiment of the present disclosure.

In order to improve the general adaptability of the technical solutions of the present disclosure to different types and strengths of adversarial attacks, it is suggested that a plurality of denoisers are acquired by training noise images of different intensities, and then denoising, reconstruction and adversarial sample detection are performed through the plurality of denoisers. The principle of the final defense solution is shown in FIG. 2.

Figure 3:
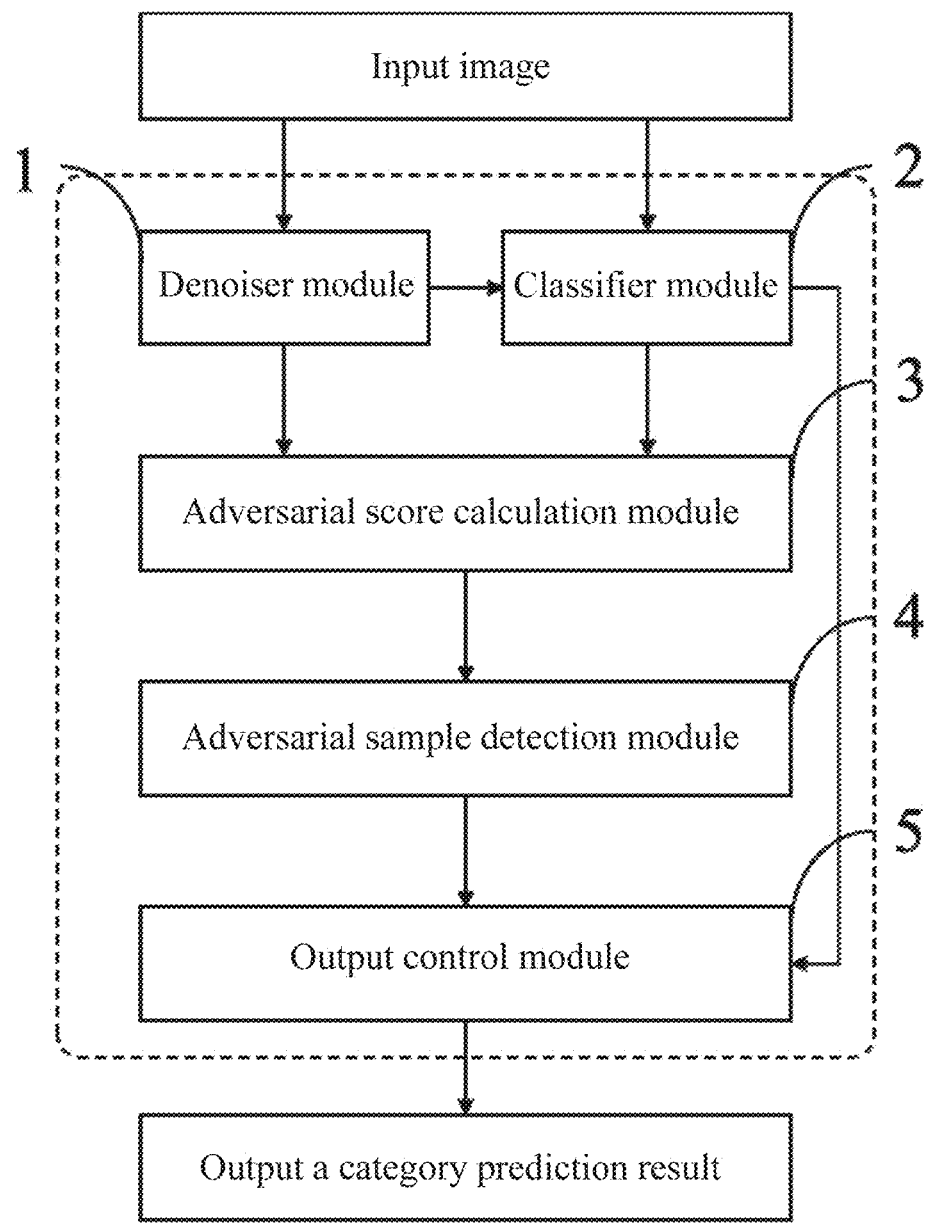
FIG. 3 is a block diagram of a system for defending against an adversarial sample in image classification according to an embodiment of the present disclosure.

In order to implement the solution for defending against an adversarial sample in image classification, the embodiment of the present disclosure constructs a system for defending against an adversarial sample in image classification. As shown in FIG. 3, the system includes five core modules:

(1) Denoiser module. It uses a stacked denoising network formed by combining down-sampling and up-sampling operations based on the EFE block and the MSF block of the present disclosure as the backbone structure. It is obtained by training with the visual and categorical features-guided loss function of the present disclosure, and is mainly used for denoising and reconstruction of input images.

(2) Classifier module. It includes a target classification model to acquire the predicted category probability distribution of the input image and the predicted category probability distribution of the image reconstructed by the denoiser module. Its implementation is not limited to neural network models, and is also applicable to classification models implemented by other traditional ML technologies (such as DTs and SVMs).

(3) Adversarial score calculation module. It acquires the key information needed to calculate the adversarial score from the denoiser module and the classifier module, so as to calculate the adversarial score of the input image.

(4) Adversarial sample detection module. It implements threshold-based adversarial sample detection based on the adversarial score of the input image and the detection threshold set according to the adversarial score distribution of the benign sample. It determines an input image with an adversarial score exceeding the threshold as an adversarial sample, and determines an input image with an adversarial score not exceeding the threshold as a benign sample.

(5) Output control module. For the adversarial sample, the output control module outputs the classification result of the image reconstructed by the denoiser according to the determination result of the adversarial sample detection module. For the benign sample, the output control module outputs the classification result of the original input image without being reconstructed by the denoiser.

The present disclosure belongs to the field of artificial intelligence (AI) systems, and relates to the security of ML models. At present, intelligent systems based on ML methods, especially deep learning (DL) algorithms, are vulnerable to adversarial sample deception. To solve this problem, the present disclosure designs an adversarial sample defense method based on integrated adversarial denoising. The design core of the present disclosure is as follows. First, the present disclosure proposes an EFE block. The EFE block can effectively capture edge contour information in an image feature map to assist denoising and enhance important feature information in the feature map. Secondly, combining the EFE block with an MSF block, using down-sampling and up-sampling operations for concatenating and stacking, the present disclosure designs an EFE-based denoising network with better denoising performance. Then the present disclosure designs a visual and categorical features-guided loss function to minimize the visual and categorical reconstruction losses of the training sample through the EFE-based denoising network, so as to optimize the parameters of the denoising network and improve the adversarial denoising performance. Finally, the present disclosure sets up a threshold-based adversarial sample detection method with the help of adversarial scoring through the denoiser trained by the above method. In this way, the present disclosure implements the adversarial sample defense solution based on integrated adversarial denoising.

More specifically, the structure of the EFE block proposed by the present disclosure is shown in FIG. 4. In the EFE block, the input tensor is processed with a plurality of calculation flows. In the Gaussian smoothing flow, the input tensor is blurred by a Gaussian Blur operation, useful information in the feature map is adaptively extracted through a Convolution operation, and a Batch Norm operation is performed on the extracted feature map. Then, the input tensor is processed by a Leaky ReLU operation to finally output a result. The main purpose of this calculation flow is to dilute unwanted noise in the input feature map. In the EFE flow, edge feature extraction is performed on the input tensor through an Edge Detection operator, which highlights the important information of the edge contour in the feature map and weakens the unwanted noise in other regions. Then, the input tensor is processed by the Convolution operation, the Batch Norm operation and the Leaky ReLU operation sequentially to output a result. The main purpose of this calculation flow is to enhance the important feature information in the input feature map. In the convolution flow, no special processing is performed on the input feature tensor. The feature is extracted directly through the Convolution operation and then a result is output after the Batch Norm operation and the Leaky ReLU operation. The main purpose of this calculation flow is to retain the low-frequency feature information in the original input feature map and propagate backwards. Then, the multi-channel features acquired by the three calculation flows are concatenated through a Concatenate operation. The Convolution operation is performed on the multi-channel features after concatenation to reduce the number of channels and the amount of calculation, and adaptively retain the important feature map extracted in the previous operation. Finally, the feature map extracted by the EFE block is output.

More specifically, the structure of the MSF block proposed by the present disclosure is shown in FIG. 5. In the MSF block, the input tensor is processed with a plurality of calculation flows. The calculation flows each sequentially include the Convolution operation, the Batch Norm operation and the Leaky ReLU. It should be emphasized that in different calculation flows, convolution kernels of different scales are appropriately selected to extract image feature information at different scales through observation windows of different sizes, so as to acquire more complete image structure and content information. Then, the Concatenate operation is performed to concatenate multi-channel features acquired by the plurality of tensor calculation flows. The Convolution operation is performed by using a 1×1 convolution kernel, which adaptively extracts and retains useful feature information in a multi-channel feature map and reduces the number of channels and the amount of model computation. Finally, the feature map extracted by the MSF block is output.

The present disclosure implements an EFE-based convolutional autoencoder-decoder network by stacking the MSF block and the EFE block together and adopting the down-sampling operation in the encoding phase and the up-sampling operation in the decoding phase. The present disclosure designs long skip connections (LSCs) to stabilize the model training process and retain the low-frequency features of images in the deep networks. In this way, the present disclosure implements an EFE-based denoising network, the backbone structure of which is shown in FIG. 6.

More specifically, in order to improve the adversarial denoising performance of the denoiser, the present disclosure uses the EFE-based denoising network as the backbone structure. On this basis, the present disclosure proposes a vision and class-guided adversarial denoising loss function, which adds constraints from the two aspects of visual similarity and categorical similarity to improve the adversarial denoising performance of the denoiser.

The present disclosure assumes that image features can be divided into visual features included in the image content itself and categorical features, where visual features refer to the image content information that can be directly acquired from the image by the naked eye, and categorical features refer to the categorical prediction information output by the target classification model for the image. Traditional image denoising methods often only consider the visual features of the image and take minimizing the visual similarity and distance between the denoised image and the original noise-free image as the training objective to remove the unwanted noise in the image. The adversarial denoising task is not exactly the same as the traditional image denoising task. During the generation of the adversarial sample, the attacker usually adds adversarial noise that is imperceptible to the human eye in the original image, such that the adversarial sample deceives the target classification model to output a wrong result. The noise usually does not change the visual features of the image much, so as to make the generated adversarial sample difficult to detect by the human eye. Therefore, the adversarial denoising task needs to remove the unwanted noise included in the adversarial sample like the traditional denoising task. More importantly, the adversarial denoising task needs to recover adversarial sample to a benign sample that can be correctly classified by the target classification model.

Based on the above analysis, the present disclosure constructs a visual and categorical features-guided loss function, which is expressed as follows:

$$Loss = \alpha \cdot \|x - D(x')\|_p - (1-\alpha) \cdot KL(C(x) \| C(D(x')))$$

where, $x$ denotes a clean training sample; $x' = x - n_o$ denotes a noise image produced by adding noise, $n_o$ denotes additive white Gaussian noise (AWGN) with a strength $\sigma$; $D(\cdot)$ denotes the denoising network; measures a visual similarity between a denoised image and an original noise-free image by a p-norm; the penalty item guides the denoising network to remove unwanted noise in a visual domain; $C(\cdot)$ denotes the target classification model, and is configured to acquire the predicted category probability distribution of the input image; KL(p||q) denotes a KL divergence between two distributions p and q, and is configured to measure a dissimilarity between the two distributions p and q; KL(C(x)||C(D(x'))) constrains the categorical feature of the denoised reconstructed image to remain unchanged; and α∈[0,1] denotes a trade-off coefficient between the two items.

More specifically, the present disclosure implements the adversarial denoising network by using the EFE-based denoising network as the backbone structure and the visual and categorical features-guided loss function as the training objective to optimize the parameters of the denoising network. Based on this, the present disclosure proposes an adversarial sample defense solution based on adversarial denoising, the working principle of which is shown in FIG. 2.

When only one denoiser is used, the workflow of this solution mainly includes:

(1) Input a test sample into the adversarial denoising network implemented by the above method and denoise and reconstruct the input image by the adversarial denoising network to acquire a denoised image.

(2) Input the denoised image into the target classification model and acquire a predicted category probability distribution of the denoised image from the target classification model.

(3) Input an original image without being processed by the adversarial denoising network into the target classification model and acquire a predicted category probability distribution of the original input image from the target classification model.

(4) Calculate a visual reconstruction error and a categorical reconstruction error between the reconstructed image denoised by the adversarial denoising network and the original image without being processed by the adversarial denoising network; calculate an adversarial score of the input image, and compare the adversarial score with a threshold to perform adversarial detection; determine the input image as an adversarial sample if the adversarial score of the input image is greater than the threshold; and determine the input image as a benign sample if the adversarial score of the input image is less than the threshold.

(5) Output a category prediction result for the original input image; output a category prediction result of the image processed by the adversarial denoising network if the input image is determined as an adversarial sample; and output a category prediction result of the original input image without being reconstructed by the adversarial denoising network if the input image is determined as a benign sample.

In Step (5), the adversarial score is calculated as follows:

Adversarial Score=$\|x-D(x)\|_p+KL(C(x)\|C(D(x))$ where, x denotes the input image; D(x) denotes the reconstructed image acquired by preprocessing by a denoiser D(•); $\|x-D(x)\|_p$ denotes the visual reconstruction error, measured by using a p-norm, between the original input image and the reconstructed image acquired by preprocessing by the denoiser; C(•) denotes the predicted category probability distribution output by the target classification model; and KL(C(x)||C(D(x))) denotes the KL divergence between the predicted category probability distributions, output by the target classification model, of the original input image and the denoised image, and measures the categorical reconstruction error of the input image.

In general, the benign sample has a smaller visual reconstruction error before and after being denoised and a smaller categorical reconstruction error before and after being reconstructed. The benign sample is often classified into a true category by the target classification model and has a smaller adversarial score. The adversarial sample has adversarial noise, and thus has a larger visual reconstruction error due to the removal of a large amount of noise. The classification results of the adversarial sample by the target classification model will be recovered from the adversarial category to the real category, resulting in a large categorical reconstruction error. The adversarial score of the adversarial sample is larger and far from the normal distribution of the adversarial score of the benign sample. Therefore, normal and benign samples can be effectively distinguished by adversarial scoring.

Furthermore, in order to more accurately distinguish the adversarial sample from the benign sample, the present disclosure proposes to use a SoftMax function defined with a temperature to calculate the categorical reconstruction error, which introduces a hyperparameter T in a traditional SoftMax operation, and is calculated as follows:

$$SoftMax(l)_i = \frac{\exp(l_i/T)}{\sum_{j=1}^{n} \exp(l_j/T)}$$

where, for an n-category problem, $l_i$ denotes a component of a logits vector l output by the target classification model C(•) on a category l, and T denotes the temperature, and is a hyperparameter. Different temperatures T have different smoothing (T<1) or sharpening (T>1) effects on the predicted category probability distributions output by the model. Experience shows that when the strength of the adversarial attack is lower, the SoftMax with a lower temperature has a stronger ability to detect the adversarial sample, and when the strength of the adversarial attack is higher, the SoftMax with a higher temperature is more sensitive. Thus, the present disclosure provides the defender with more choices, allowing the defender to select more appropriate hyperparameters according to security requirements.

Furthermore, the present disclosure supports the expansion of the above solution according to defense requirements. In Step (2), different hyperparameters are selected to train a plurality of adversarial denoising networks that are sensitive to attacks of different types and strengths. In Step (4), for different adversarial denoising networks, a corresponding adversarial score threshold is set, and the ratio of the adversarial score of the input image to the threshold is calculated to realize the detection of the adversarial sample. If the ratio is greater than 1, that is, the adversarial score of the input image is greater than the threshold, the input image is determined as an adversarial sample. Otherwise, if the ratio is less than 1, the input image is determined as a benign sample. In this embodiment, it is set that as long as the adversarial score corresponding to one of the adversarial denoising networks exceeds the threshold, it is determined that the input image is an adversarial sample. Therefore, the determination condition in the case of a plurality of adversarial denoisers integrated is improved as:

$$\text{Max}\left(\frac{S_1}{T_1}, \ldots, \frac{S_n}{T_n}\right) > 1$$

where, $S_i$ denotes the adversarial score calculated after denoising and reconstructing the original input image by the adversarial denoising network $D_i$; $T_i$ denotes the adversarial detection threshold set according to the adversarial score distribution after denoising and reconstructing the benign sample by the adversarial denoising network $D_i$, which is an important hyperparameter of the defense solution; and i∈[1, 2, ..., n] is the number of the adversarial denoising network, assuming there are n adversarial denoising networks in total.

In step (5), if the input image is determined as a benign sample, the category prediction result of the target classification model on the original input image without being reconstructed by the adversarial denoising network is output. Otherwise, if the input image is determined as an adversarial sample, the category prediction result of the image reconstructed by an adversarial denoising network corresponding to a ratio greater than 1, that is, one successfully detecting the adversarial sample, is output.

Compared with the prior art, the system for defending against an adversarial sample in image classification implemented by this embodiment is improved in many aspects. First, the defense system decouples the adversarial attack during training and deployment, and utilizes an adversarial detection method based on an adversarial score threshold to avoid reliance on knowledge of specific adversarial sample attacks. The implementation and deployment of the entire defense system are accomplished without adversarial samples, which solves the problem of natural "specificity" of traditional defense models that rely on adversarial sample training, and further improves the system's defense capability against unknown adversarial sample attacks. Second, the defense system does not need to modify the original target classification model. Many existing methods require adjustments to the structure or training process of the original classification model, which requires a lot of retraining work. In the context of real large-scale engineering practice applications, the existing methods greatly increase the additional overhead and cost required to deploy defense systems. On the contrary, this embodiment does not need to adjust the original target classification model, and does not even limit the implementation technology of the target classification model, but only regards it as a "black box" to obtain the predicted category probability distribution of the input image. This design significantly saves the engineering costs required for the deployment of the defense system. Furthermore, the defense system has high flexibility. The adversarial denoising network itself and the defense system based on integrated denoising both benefit from the EFE block and the MSF block implemented in this embodiment. They can easily achieve "plug and play" and "flexible expansion", and the parameter amount and calculation amount of the defense system can be flexibly adjusted according to the user's demand for defense performance. In addition, with relatively little space and time overhead, a stable defense against adversarial sample attacks of different types and strengths is achieved, and the defense effectiveness does not drop due to changes in the types and strengths of adversarial sample attacks.

It should be noted that the above content is only an embodiment of the present disclosure, and any non-innovative improvements made to the content of the present disclosure on this basis belong to the technical content of the present disclosure. The improvements include but are not limited to: stacking the MSF blocks and the EFE blocks in different numbers and arrangements to form denoising networks of different depths and widths, arranging different numbers of adversarial denoising networks to form a denoising module, and using different hyperparameters during training, such as noise intensity σ, trade-off coefficient α and SoftMax temperature T.

The method proposed by the present disclosure can effectively detect adversarial samples from input samples, and realize effective defense against adversarial samples. In this embodiment, simulation tests were performed on MNIST, CIFAR-10 and ImageNet datasets. On the MNIST dataset, the detection accuracy of adversarial samples was 98.3%, and the recall rate was 98.7%. On the CIFAR-10 dataset, the detection accuracy of adversarial samples was 92.7%, and the recall rate was 91.6%. On the ImageNet dataset, the detection accuracy of adversarial samples was 89.4%, and the recall rate was 88.1%. Correspondingly, after the defense device was deployed, the classification accuracy reached 98.1% on the MNIST dataset, 91.35% on the CIFAR-10 dataset, and 87.61% on the ImageNet dataset.

Some or all of the functions in the foregoing embodiments may be implemented by software, hardware, firmware, or any combination thereof. When implemented in the form of a computer program product in whole or part, the computer program product includes one or more computer instructions. When the computer program instructions are loaded and executed on a computer, the procedures or functions according to the embodiments of the present disclosure are all or partially generated. The computer may be a general-purpose computer, a dedicated computer, a computer network, or another programmable device. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD), a semiconductor medium (for example, a solid state disk (SSD)), or the like.

The foregoing are merely descriptions of the specific embodiments of the present disclosure, and the protection scope of the present disclosure is not limited thereto. Any modification, equivalent replacement, improvement, etc. made within the technical scope of the present disclosure by a person skilled in the art according to the spirit and principle of the present disclosure shall fall within the protection scope of the present disclosure.

What is claimed is:

1. A method for defending against an adversarial sample in image classification, comprising: denoising, by an adversarial denoising network, an original input image to acquire a reconstructed image; acquiring, by a target classification model, a predicted category probability distribution of the reconstructed image; acquiring, by the target classification model, a predicted category probability distribution of the original input image; calculating an adversarial score of the original input image, and determining the original input image as an adversarial sample or a benign sample according to a threshold; outputting a category prediction result of the reconstructed image when the original input image is determined as the adversarial sample; and outputting a category prediction result of the original input image when the original input image is determined as the benign sample.

2. The method for defending against the adversarial sample in the image classification according to claim 1, comprising the following steps:
   step 1: preprocessing, by the adversarial denoising network, the original input image to acquire the reconstructed image;
   step 2: inputting the reconstructed image into the target classification model and acquiring the predicted category probability distribution of the reconstructed image from the target classification model;
   step 3: inputting the original input image without being processed by the adversarial denoising network into the target classification model and acquiring the predicted category probability distribution of the original input image from the target classification model;
   step 4: calculating an adversarial score of the original input image by a visual reconstruction error and a categorical reconstruction error between the reconstructed image and the original input image; and
   step 5: outputting a classification result of the original input image based on an adversarial detection result of the original input image.

3. The method for defending against the adversarial sample in the image classification according to claim 2, wherein in step 1, the adversarial denoising network is obtained by training with a noise image produced by adding white Gaussian noise (WGN) to a clean benign sample, using an edge feature enhancement (EFE)-based denoising network as a backbone and a visual and categorical features-guided adversarial loss function as a training objective to optimize a parameter of the adversarial denoising network; and
   the EFE-based denoising network is a denoising autoencoder-decoder network, wherein the denoising autoencoder-decoder network adopts, based on an EFE block and a multi-scale feature (MSF) block, a down-sampling operation in an encoding phase and an up-sampling operation in a decoding phase, and designs a long skip connection (LSC) between intermediate layers.

4. The method for defending against the adversarial sample in the image classification according to claim 3, wherein the EFE block is configured to:
   process an input tensor with three calculation flows, comprising a Gaussian smoothing flow, an EFE flow and a convolution flow: process, in the Gaussian smoothing flow, the input tensor by a Gaussian Blur operation, a Convolution operation, a batch normalization (Batch Norm) operation and a leaky rectified linear unit (Leaky ReLU) operation sequentially, and then output a first result; process, in the EFE flow, the input tensor by an Edge Detection operation, the Convolution operation, the Batch Norm operation and the Leaky ReLU operation sequentially, and then output a second result; process, in the convolution flow, the input tensor by the Convolution operation, the Batch Norm operation and the Leaky ReLU operation sequentially, and then output a third result; and concatenate the first result output by the Gaussian smoothing flow, the second result output by the EFE flow and the third result output by the convolution flow by a Concatenate operation, perform the Convolution operation to reduce a number of channels, and output a calculation result; and the MSF block is configured to:
   process the input tensor with a plurality of calculation flows: process the input tensor by the Convolution operation, the Batch Norm operation and the Leaky ReLU operation sequentially in each of the plurality of calculation flows; appropriately select convolution kernels of different sizes to extract feature information of different scales in different calculation flows; and concatenate, by the Concatenate operation, multi-channel features acquired by the plurality of calculation flows, and perform the Convolution operation by using a 1×1 convolution kernel to adaptively extract and retain useful feature information in a multi-channel feature map.

5. The method for defending against the adversarial sample in the image classification according to claim 2, wherein in step 1, the adversarial denoising network is trained with a visual and categorical features-guided loss function as an optimization objective;
   the visual and categorical features-guided loss function comprises a visual feature similarity loss item and a categorical feature similarity loss item, wherein
   the visual feature similarity loss item is:

$$\|x-D(x')\|_p;$$

wherein, x denotes a clean training sample; $x'=x+n_\sigma$ denotes a noise image produced by adding noise, $n_\sigma$ denotes additive white Gaussian noise (AWGN) with a strength σ; D(•) denotes the adversarial denoising network; and $\|x-D(x')\|_p$ measures a visual similarity between a denoised image and an original noise-free image by a p-norm, and a penalty item guides the adversarial denoising network to remove unwanted noise in a visual domain;
   the categorical feature similarity loss item is:

$$KL(C(x)\|C(D(x')));$$

wherein, C(•) denotes the target classification model, and is configured to acquire the predicted category probability distribution of the denoised reconstructed image D(x') and the predicted category probability distribution of the original input image x, that is, output vectors of a SoftMax layer; KL(p||q) denotes a Kullback-Leibler (KL) divergence between two distributions p and q, and is configured to measure a dissimilarity between the two distributions p and q; and KL(C(x)||C(D(x'))) constrains the denoised reconstructed image to maintain a same categorical feature as the original input image;
   the visual and categorical features-guided loss function is:

$$\text{Loss}=\alpha\cdot\|x-D(x')\|_p+(1-\alpha)\cdot KL(C(x)\|C(D(x')));$$

wherein, α∈[0, 1] denotes a trade-off coefficient between the visual feature similarity loss item and the categorical feature similarity loss item, taking a parameter of the adversarial denoising network as an optimization object and the visual and categorical features-guided loss function as a minimization objective.

6. The method for defending against the adversarial sample in the image classification according to claim 2, wherein in step 4, the adversarial score calculated based on the visual reconstruction error and the categorical reconstruction error is used as a basis for determining whether the original input image is the adversarial sample or the benign sample; wherein the visual reconstruction error is:

$$\|x-D(x)\|_p;$$

wherein, x denotes the original input image; D(x) denotes the reconstructed image acquired by preprocessing by a denoiser D(•); and $\|x-D(x)\|_p$ denotes the visual reconstruction error, measured by using a p-norm, between the original input image and the reconstructed image acquired by preprocessing by the denoiser;

the categorical reconstruction error is:

$$KL(C(x)\|C(D(x)));$$

wherein, this item uses a KL divergence as a metric to measure a dissimilarity between the predicted category probability distribution of the reconstructed image D(x) acquired by preprocessing by the denoiser D(•) and the predicted category probability distribution of the original input image x; and the predicted category probability distribution of the reconstructed image D(x) and the predicted category probability distribution of the original input image x are denoted by output vectors of a SoftMax layer of the target classification model C(•);

the adversarial score of a test sample is calculated as follows:

$$\text{Adversarial Score}=\|x-D(x)\|_p+KL(C(x)\|C(D(x)));$$

wherein, a corresponding adversarial score threshold is set according to an adversarial score distribution of the benign sample; and the original input image with an adversarial score exceeding the adversarial score threshold is determined as the adversarial sample, and the original input image with an adversarial score not exceeding the adversarial score threshold is determined as the benign sample, wherein the benign sample and the adversarial sample are effectively distinguished;

in a training phase, a plurality of denoisers are acquired by training with noise of different strengths, and are used to calculate adversarial score thresholds based on the benign sample; in a testing phase, the test sample is reconstructed through the plurality of denoisers integrated, and then input into the target classification model to calculate adversarial scores; the adversarial scores are compared with the adversarial score thresholds; when an adversarial score exceeds an adversarial score threshold, a ratio of a component is greater than 1; when a maximum ratio is greater than 1, the original input image is determined as the adversarial sample, and a classification result of an image reconstructed by a denoiser corresponding to the component with a ratio greater than 1 is output; and when the original input image is determined as the benign sample, a classification result of the original input image without being processed by the denoiser is output; and a SoftMax function defined with a temperature is used to process a model output, so as to acquire a predicted category probability distribution:

$$SoftMax(l)_i = \frac{\exp(l_i/T)}{\sum_{j=1}^{n} \exp(l_j/T)};$$

wherein, for an n-category problem, $l_i$ denotes a component of a logits vector l output by the target classification model C(•) on a category i, and T denotes the temperature, and is a hyperparameter.

7. A system for defending against an adversarial sample in image classification by the method for defending against the adversarial sample in the image classification according to claim 1, comprising:

a denoiser module, comprising the adversarial denoising network, and configured to denoise and reconstruct the original input image;

a classifier module, comprising the target classification model, and configured to acquire a predicted category probability distribution of the original input image and a predicted category probability distribution of a reconstructed image acquired by preprocessing the original input image;

an adversarial score calculation module, configured to calculate an adversarial score of the original input image;

an adversarial sample detection module, configured to compare the adversarial score of the original input image with a normal threshold of a benign sample to perform adversarial determination on the original input image; and an output control module, configured to output a category prediction result of the original input image based on an adversarial determination result of the original input image.

8. A data processing terminal, wherein the data processing terminal is configured to implement the system for defending against the adversarial sample in the image classification according to claim 7.

9. The system for defending against the adversarial sample in the image classification according to claim 7, wherein the method for defending against the adversarial sample in the image classification comprises the following steps:

step 1: preprocessing, by the adversarial denoising network, the original input image to acquire the reconstructed image;

step 2: inputting the reconstructed image into the target classification model and acquiring the predicted category probability distribution of the reconstructed image from the target classification model;

step 3: inputting the original input image without being processed by the adversarial denoising network into the target classification model and acquiring the predicted category probability distribution of the original input image from the target classification model;

step 4: calculating an adversarial score of the original input image by a visual reconstruction error and a categorical reconstruction error between the reconstructed image and the original input image; and step 5: outputting a classification result of the original input image based on an adversarial detection result of the original input image.

10. The system for defending against the adversarial sample in the image classification according to claim 9, wherein in step 1, the adversarial denoising network is obtained by training with a noise image produced by adding white Gaussian noise (WGN) to a clean benign sample, using an edge feature enhancement (EFE)-based denoising network as a backbone and a visual and categorical features-guided adversarial loss function as a training objective to optimize a parameter of the adversarial denoising network; and the EFE-based denoising network is a denoising autoencoder-decoder network, wherein the denoising autoencoder-decoder network adopts, based on an EFE block and a multi-scale feature (MSF) block, a down-sampling operation in an encoding phase and an up-sampling operation in a decoding phase, and designs a long skip connection (LSC) between intermediate layers.

11. The system for defending against the adversarial sample in the image classification according to claim 10, wherein the EFE block is configured to:
process an input tensor with three calculation flows, comprising a Gaussian smoothing flow, an EFE flow and a convolution flow: process, in the Gaussian smoothing flow, the input tensor by a Gaussian Blur operation, a Convolution operation, a batch normalization (Batch Norm) operation and a leaky rectified linear unit (Leaky ReLU) operation sequentially, and then output a first result; process, in the EFE flow, the input tensor by an Edge Detection operation, the Convolution operation, the Batch Norm operation and the Leaky ReLU operation sequentially, and then output a second result; process, in the convolution flow, the input tensor by the Convolution operation, the Batch Norm operation and the Leaky ReLU operation sequentially, and then output a third result; and concatenate the first result output by the Gaussian smoothing flow, the second result output by the EFE flow and the third result output by the convolution flow by a Concatenate operation, perform the Convolution operation to reduce a number of channels, and output a calculation result; and the MSF block is configured to:

process the input tensor with a plurality of calculation flows: process the input tensor by the Convolution operation, the Batch Norm operation and the Leaky ReLU operation sequentially in each of the plurality of calculation flows; appropriately select convolution kernels of different sizes to extract feature information of different scales in different calculation flows; and concatenate, by the Concatenate operation, multi-channel features acquired by the plurality of calculation flows, and perform the Convolution operation by using a 1×1 convolution kernel to adaptively extract and retain useful feature information in a multi-channel feature map.

12. The system for defending against the adversarial sample in the image classification according to claim 9, wherein in step 1, the adversarial denoising network is trained with a visual and categorical features-guided loss function as an optimization objective;

the visual and categorical features-guided loss function comprises a visual feature similarity loss item and a categorical feature similarity loss item, wherein
the visual feature similarity loss item is:

$$\|x-D(x')\|_p;$$

wherein, x denotes a clean training sample; $x'=x+n_\sigma$ denotes a noise image produced by adding noise, $n_\sigma$ denotes additive white Gaussian noise (AWGN) with a strength $\sigma$; $D(\bullet)$ denotes the adversarial denoising network; and $\|x-D(x')\|_p$ measures a visual similarity between a denoised image and an original noise-free image by a p-norm, and a penalty item guides the adversarial denoising network to remove unwanted noise in a visual domain;

the categorical feature similarity loss item is:

$$KL(C(x)\|C(D(x')));$$

wherein, $C(\bullet)$ denotes the target classification model, and is configured to acquire the predicted category probability distribution of the denoised reconstructed image $D(x')$ and the predicted category probability distribution of the original input image x, that is, output vectors of a SoftMax layer; $KL(p\|q)$ denotes a Kullback-Leibler (KL) divergence between two distributions p and q, and is configured to measure a dissimilarity between the two distributions p and q; and $KL(C(x)\|C(D(x')))$ constrains the denoised reconstructed image to maintain a same categorical feature as the original input image;

the visual and categorical features-guided loss function is:

$$\text{Loss}=\alpha\cdot\|x-D(x')\|_p+(1-\alpha)\cdot KL(C(x)\|C(D(x')));$$

wherein, $\alpha\in[0, 1]$ denotes a trade-off coefficient between the visual feature similarity loss item and the categorical feature similarity loss item, taking a parameter of the adversarial denoising network as an optimization object and the visual and categorical features-guided loss function as a minimization objective.

13. The system for defending against the adversarial sample in the image classification according to claim 9, wherein in step 4, the adversarial score calculated based on the visual reconstruction error and the categorical reconstruction error is used as a basis for determining whether the original input image is the adversarial sample or the benign sample; wherein the visual reconstruction error is:

$$\|x-D(x)\|_p;$$

wherein, x denotes the original input image; $D(x)$ denotes the reconstructed image acquired by preprocessing by a denoiser $D(\bullet)$; and $\|x-D(x)\|_p$ denotes the visual reconstruction error, measured by using a p-norm, between the original input image and the reconstructed image acquired by preprocessing by the denoiser;
the categorical reconstruction error is:

$$KL(C(x)\|C(D(x)));$$

wherein, this item uses a KL divergence as a metric to measure a dissimilarity between the predicted category probability distribution of the reconstructed image $D(x)$ acquired by preprocessing by the denoiser $D(\bullet)$ and the predicted category probability distribution of the original input image x; and the predicted category probability distribution of the reconstructed image $D(x)$ and the predicted category probability distribution of the original input image x are denoted by output vectors of a SoftMax layer of the target classification model $C(\bullet)$;
the adversarial score of a test sample is calculated as follows:

$$\text{Adversarial Score}=\|x-D(x)\|_p+KL(C(x)\|C(D(x)));$$

wherein, a corresponding adversarial score threshold is set according to an adversarial score distribution of the benign sample; and the original input image with an adversarial score exceeding the adversarial score threshold is determined as the adversarial sample, and the original input image with an adversarial score not exceeding the adversarial score threshold is determined as the benign sample, wherein the benign sample and the adversarial sample are effectively distinguished;

in a training phase, a plurality of denoisers are acquired by training with noise of different strengths, and are used to calculate adversarial score thresholds based on the benign sample; in a testing phase, the test sample is reconstructed through the plurality of denoisers integrated, and then input into the target classification model to calculate adversarial scores; the adversarial scores are compared with the adversarial score thresholds; when an adversarial score exceeds an adversarial score threshold, a ratio of a component is greater than 1; when a maximum ratio is greater than 1, the original input image is determined as the adversarial sample, and a classification result of an image reconstructed by a denoiser corresponding to the component with a ratio greater than 1 is output; and when the original input image is determined as the benign sample, a classification result of the original input image without being processed by the denoiser is output; and a SoftMax function defined with a temperature is used to process a model output, so as to acquire a predicted category probability distribution:

$$SoftMax(l)_i = \frac{\exp(l_i/T)}{\sum_{j=1}^{n} \exp(l_j/T)};$$

wherein, for an n-category problem, $l_i$ denotes a component of a logits vector l output by the target classification model C(•) on a category i, and T denotes the temperature, and is a hyperparameter.

14. A computer device, wherein the computer device comprises a memory and a processor; the memory stores a computer program; and the computer program is executed by the processor to implement the following steps:

denoising, by an adversarial denoising network, an original input image to acquire a reconstructed image; acquiring, by a target classification model, a predicted category probability distribution of the reconstructed image; acquiring, by the target classification model, a predicted category probability distribution of the original input image; calculating an adversarial score of the original input image, and determining the original input image as an adversarial sample or a benign sample according to a threshold; outputting a category prediction result of the reconstructed image when the original input image is determined as the adversarial sample; and outputting a category prediction result of the original input image when the original input image is determined as the benign sample.

15. A non-transitory computer-readable storage medium, storing a computer program, wherein the computer program is executed by a processor to implement the following steps:

denoising, by an adversarial denoising network, an original input image to acquire a reconstructed image; acquiring, by a target classification model, a predicted category probability distribution of the reconstructed image; acquiring, by the target classification model, a predicted category probability distribution of the original input image; calculating an adversarial score of the original input image, and determining the original input image as an adversarial sample or a benign sample according to a threshold; outputting a category prediction result of the reconstructed image when the original input image is determined as the adversarial sample; and outputting a category prediction result of the original input image when the original input image is determined as the benign sample.

* * * * *